United States Patent
Chattopadhyay et al.

(10) Patent No.: US 11,747,444 B2
(45) Date of Patent: Sep. 5, 2023

(54) LIDAR-BASED OBJECT DETECTION AND CLASSIFICATION

(71) Applicant: Intel Corporation, Santa Clara, CA (US)

(72) Inventors: Rita Chattopadhyay, Chandler, AZ (US); Monica Lucia Martinez-Canales, Los Altos, CA (US)

(73) Assignee: Intel Corporation, Santa Clara, CA (US)

(*) Notice: Subject to any disclaimer, the term of this patent is extended or adjusted under 35 U.S.C. 154(b) by 616 days.

(21) Appl. No.: 16/103,674

(22) Filed: Aug. 14, 2018

(65) Prior Publication Data
US 2019/0049560 A1  Feb. 14, 2019

(51) Int. Cl.
| G01S 7/48 | (2006.01) |
| G01S 17/42 | (2006.01) |
| G06N 20/00 | (2019.01) |
| G01S 17/89 | (2020.01) |
| G01S 17/86 | (2020.01) |
| G01S 17/931 | (2020.01) |

(52) U.S. Cl.
CPC ............ G01S 7/4802 (2013.01); G01S 17/42 (2013.01); G01S 17/86 (2020.01); G01S 17/89 (2013.01); G01S 17/931 (2020.01); G06N 20/00 (2019.01)

(58) Field of Classification Search
None
See application file for complete search history.

(56) References Cited

U.S. PATENT DOCUMENTS

| 5,966,678 A * | 10/1999 | Lam ...................... G01S 7/4802 356/73 |
| 6,302,355 B1 * | 10/2001 | Sallee ................... F41G 7/2226 244/3.15 |
| 7,995,055 B1 * | 8/2011 | Ma ........................ G06K 9/6215 345/420 |

(Continued)

FOREIGN PATENT DOCUMENTS

| CN | 109961001 | 7/2019 |
| CN | 110826386 | 2/2020 |

(Continued)

OTHER PUBLICATIONS

"Velodyne HDL-64 Object Detection by LSA Autonomy", https://www.youtube.com/watch?v=q-Rz3BD7KKo, (Nov. 10, 2015), Video.

(Continued)

*Primary Examiner* — Hovhannes Baghdasaryan
(74) *Attorney, Agent, or Firm* — Schwegman Lundberg & Woessner, P.A.

(57) ABSTRACT

Various systems and methods for implementing LiDAR-based object detection and classification are described herein. An object detection system includes a feature extraction and object identification (FEOI) circuit to: receive segmented data of an environment around the object detection system, the segmented data obtained using a light imaging detection and ranging (LiDAR) system, oriented with respect to a direction of travel; compute spatial and structural parameters of a segment of the segmented data; and use the spatial and structural parameters with a machine learning model to obtain a classification of the segment.

25 Claims, 11 Drawing Sheets

(56) References Cited

U.S. PATENT DOCUMENTS

| | | | |
|---|---|---|---|
| 8,761,498 B1* | 6/2014 | Wu | G06V 20/10 |
| | | | 382/203 |
| 9,014,905 B1* | 4/2015 | Kretzschmar | G05D 1/021 |
| | | | 701/28 |
| 9,412,271 B2 | 8/2016 | Sharma | |
| 10,509,947 B1* | 12/2019 | Douillard | G06T 7/10 |
| 10,510,154 B2 | 12/2019 | Chattopadhyay et al. | |
| 2002/0048395 A1* | 4/2002 | Harman | H04N 13/128 |
| | | | 382/154 |
| 2005/0286767 A1* | 12/2005 | Hager | G06K 9/00208 |
| | | | 382/190 |
| 2010/0034422 A1* | 2/2010 | James | G06T 7/246 |
| | | | 382/103 |
| 2010/0111396 A1 | 5/2010 | Boucheron | |
| 2014/0334719 A1* | 11/2014 | Takenaka | G06K 9/00369 |
| | | | 382/159 |
| 2014/0341421 A1* | 11/2014 | Porikli | G06K 9/00369 |
| | | | 382/103 |
| 2015/0109603 A1* | 4/2015 | Kim | G01S 17/10 |
| | | | 356/4.07 |
| 2015/0221079 A1* | 8/2015 | Schultz | G01S 7/4808 |
| | | | 382/190 |
| 2017/0091578 A1* | 3/2017 | Ananthakrishnan | |
| | | | G06K 9/00637 |
| 2017/0169208 A1* | 6/2017 | Jantz | H04L 9/0861 |
| 2017/0270375 A1* | 9/2017 | Grauer | G06K 9/6293 |
| 2017/0307746 A1* | 10/2017 | Rohani | G01S 7/412 |
| 2018/0067490 A1 | 3/2018 | Pollach et al. | |
| 2018/0144202 A1* | 5/2018 | Moosaei | G06K 9/00825 |
| 2018/0189950 A1 | 7/2018 | Norouzi et al. | |
| 2018/0203113 A1* | 7/2018 | Taylor | G06K 9/00791 |
| 2018/0232583 A1* | 8/2018 | Wang | G06K 9/628 |
| 2018/0356527 A1* | 12/2018 | Kozak | G01S 17/931 |
| 2018/0365506 A1 | 12/2018 | Clifford et al. | |
| 2019/0051006 A1 | 2/2019 | Chattopadhyay et al. | |
| 2019/0187720 A1 | 6/2019 | Fowe | |
| 2019/0285752 A1 | 9/2019 | Chattopadhyay et al. | |
| 2019/0377814 A1* | 12/2019 | Shtrom | G01S 7/412 |
| 2020/0118278 A1 | 4/2020 | Mei et al. | |
| 2020/0217952 A1 | 7/2020 | Rider et al. | |

FOREIGN PATENT DOCUMENTS

| | | |
|---|---|---|
| DE | 102018129251 | 6/2019 |
| DE | 102019118999 | 2/2020 |
| EP | 3845428 | 7/2021 |
| WO | 2023009180 | 2/2023 |

OTHER PUBLICATIONS

Asvadi, Alireza, "Detection and Tracking of Moving Objects Using 2.5D Motion Grids", https://www.youtube.com/watch?v=3jZ8znHyWts,(May 29, 2016), Video.

Asvadi, Alireza, "REal-Time Deep ConvNet-based Vehicle Detection Using 3D-Lidar Reflection Intensity Data", https://www.youtube.com/watch?v=1JJHihvp7NE, (Sep. 4, 2017), Video.

Himmelsback, M, et al., "LIDAR-based 3D Object Perception", Proceedings of 1st International Workshop on Cognition for technical Systems, (2008), 7 pgs.

"U.S. Appl. No. 15/850,246, Notice of Allowance dated Aug. 16, 2019", 9 pgs.

Ester, Martin, "A Density-Based Algorithm for Discovering Clusters in Large Spatial Databases with Noise", In: Proceedings of 2nd International Conference on Knowledge Discovery and Data Mining, KDD '96, (1996), 226-231.

Wang, Chunxiao, "An Improved DBSCAN Method for LiDAR Data Segmentation with Automatic Eps Estimation", Sensors (Basel, Switzerland)vol. 19, 1 172, doi: 10.3390 s 19010172 (Year: 2019), (Jan. 5, 2019), 26 pgs.

"International Application Serial No. PCT US2022 021178, International Search Report dated Nov. 23, 2022", 3 pgs.

"International Application Serial No. PCT US2022 021178, Written Opinion dated Nov. 23, 2022", 4 pgs.

* cited by examiner

3D POINT CLOUD BEFORE FILTERING

FILTERING REDUCED DATA TO 5.07%
RESCALED

SEGMENTS IN 3D DATA

LIDAR-BASED OBJECT DETECTION AND CLASSIFICATION

TECHNICAL FIELD

Embodiments described herein generally relate to object detection systems, and in particular, to LiDAR-based digital signal processing.

BACKGROUND

In the automotive context, advanced driver assistance systems (ADAS) are those developed to automate, adapt, or enhance vehicle systems to increase safety and provide better driving. In such systems, safety features are designed to avoid collisions and accidents by offering technologies that alert the driver to potential problems, or to avoid collisions by implementing safeguards and taking over control of the vehicle. ADAS relies on various sensors that are able to detect objects. Examples of such sensors include visible light cameras, radar, laser scanners (e.g., LiDAR), acoustic (e.g., sonar), and the like.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
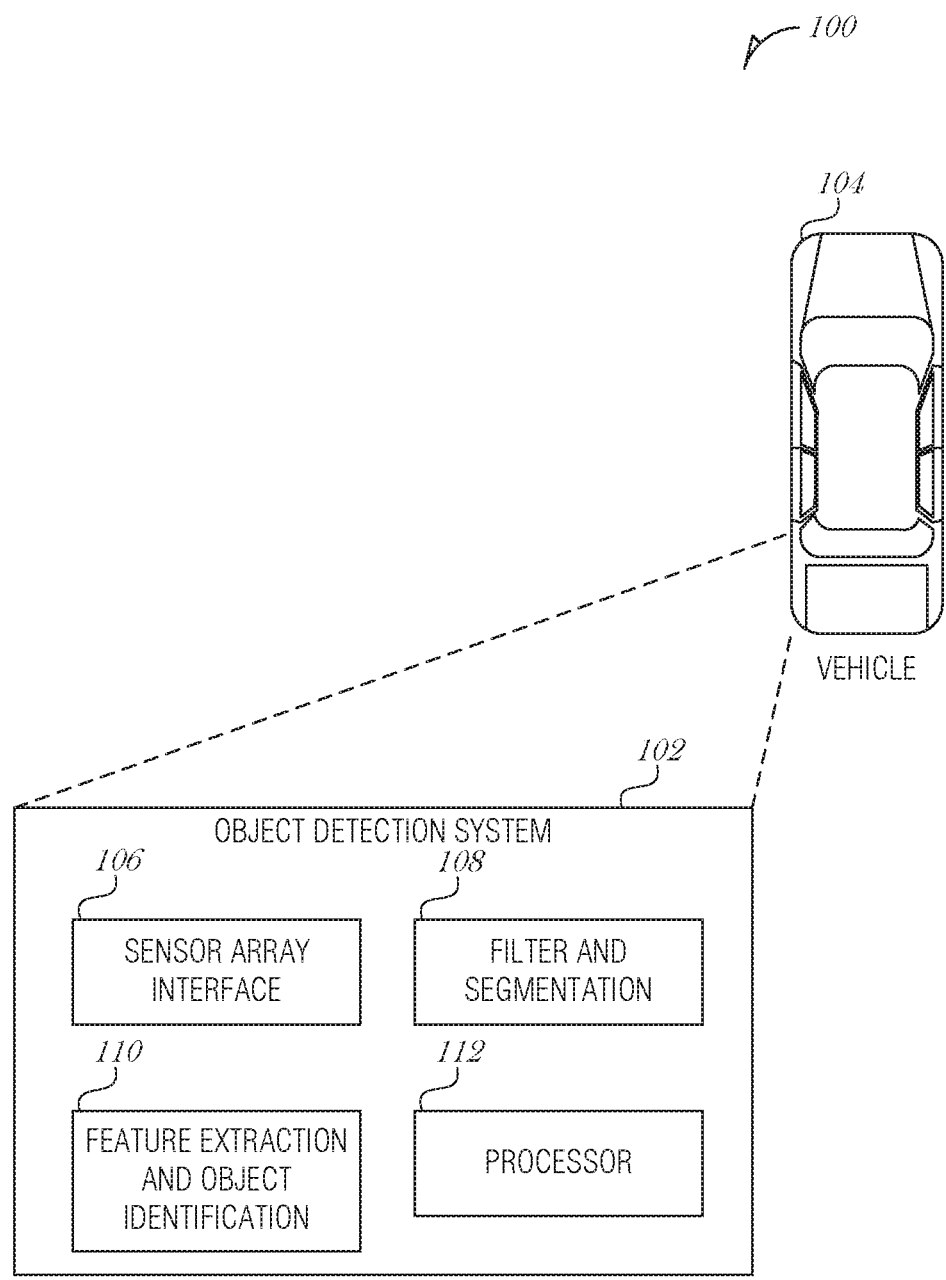
FIG. 1 is a schematic drawing illustrating a system to process LiDAR data to provide improved object detection, according to an embodiment.

In the following description, for purposes of explanation, numerous specific details are set forth in order to provide a thorough understanding of some example embodiments. It will be evident, however, to one skilled in the art that the present disclosure may be practiced without these specific details.

Vehicles may include various forward, sideward, and rearward facing sensors. The sensors may include radar, LiDAR (light imaging detection and ranging), cameras, ultrasound, infrared, or other sensor systems. Front-facing sensors may be used for adaptive cruise control, parking assistance, lane departure, collision avoidance, pedestrian detection, and the like. Rear-facing sensors may be used to alert the driver of potential obstacles (e.g., vehicles) when performing lane changes or when backing up at slow speeds (e.g., parking distance monitors).

Autonomous vehicles (AVs) may be partially or fully autonomous and may operate in a partial or full autonomous mode for some or all of the time. Partial autonomous mode may provide various collision avoidance, driver alert systems, lane change warnings, and the like. In contrast, full autonomous mode may relieve the driver from nearly all operational aspects. Modes may be changed during a driving session. For instance, a driver may operate an AV in partial autonomous mode while in the city, and then initiate full autonomous operation after reaching a stretch of highway.

Autonomous driving and advanced driver assistance systems (ADAS) may rely on signals from a diverse set of sensors including camera, LiDAR, radar, global positioning systems (GPS), and an inertial measurement unit (IMU). The signals are used to perform two primary tasks: simultaneous localization and mapping (SLAM), which generates a map of the environment while simultaneously localizing the vehicle within the map; and detection and tracking of moving objects (DATMO) surrounding the vehicle and the prediction of objects' future behavior.

LiDAR is a surveying method that measures distance to a target by illuminating that target with a pulsed laser light, and measuring the reflected pulses with a sensor. Differences in laser return times and wavelengths are used to make digital 3D-representations of the target. LiDAR is popularly used to make high-resolution maps, with applications in geodesy, geomatics, archaeology, geography, geology, geomorphology, seismology, forestry, atmospheric physics, laser guidance, airborne laser swath mapping, and laser altimetry. The technology is also used for control and navigation for AVs.

Object identification is an integral part of in-vehicle navigation systems of AVs. Traditionally, only image data is used for identifying objects such as pedestrians, vehicles, road signs, trees, poles, cyclist, walls, and other objects that are encountered by an AV on the road. However, this process is highly compute intensive as generally a pre-learned model scans the entire image frame to detect and identify objects of interest. This complex processing not only requires high-performance computers inside the vehicle to complete the object identification task, but it must also complete the object identification task within the required response time, from perception to actuation, to safely handle actual hazards on the road. Additionally, Image-based object identification also suffers from problems related to illumination (shadows, glares, night time, etc.) and occlusion as the depth information is not captured. The few LiDAR-based object identification implementations that are available are too slow to use for real time operation and do not handle occluded objects well.

The improved sensor system described herein realizes advantages in the initial segmentation phase based on LiDAR data. Further, the improved sensor system uses an advanced filtering and classification methods to identify objects on or near the road. The LiDAR-based sensor system also provides advantages over visible light camera systems in that LiDAR is useful to detect and identify objects under different illumination conditions and also at different distances from the ego vehicle regardless of ambient light conditions. Thus, the sensor system described here provides a multi-object identification mechanism based on LiDAR-based features. The disclosed systems and methods provide a multi-object identification technique based on an adaptive clustering and efficient feature extraction, thus enabling efficient object detection and identification.

FIG. 1 is a schematic drawing illustrating a system 100 to process LiDAR data to provide improved object detection, according to an embodiment. FIG. 1 includes an object detection system 102 incorporated into the vehicle 104. The object detection system 102 includes a sensor array interface 106, a filter and segmentation (FS) circuit 108, a feature extraction and object identification (FEOI) circuit 110, and a processor 112.

The vehicle 104, which may also be referred to as an "ego vehicle" or "host vehicle", may be of any type of vehicle, such as a commercial vehicle, a consumer vehicle, a recreation vehicle, a car, a truck, a motorcycle, a boat, a drone, a robot, an airplane, a hovercraft, or any mobile craft able to operate at least partially in an autonomous mode. The vehicle 104 may operate at some times in a manual mode where the driver operates the vehicle 104 conventionally using pedals, steering wheel, and other controls. At other times, the vehicle 104 may operate in a fully autonomous mode, where the vehicle 104 operates without user intervention. In addition, the vehicle 104 may operate in a semi-autonomous mode, where the vehicle 104 controls many of the aspects of driving, but the driver may intervene or influence the operation using conventional (e.g., steering wheel) and non-conventional inputs (e.g., voice control).

The vehicle 104 includes a sensor array, which may include various forward, side, and rearward facing cameras, radar, LiDAR, ultrasonic, or similar sensors. Forward-facing is used in this document to refer to the primary direction of travel, the direction the seats are arranged to face, the direction of travel when the transmission is set to drive, or the like. Conventionally then, rear-facing or rearward-facing is used to describe sensors that are directed in a roughly opposite direction than those that are forward or front-facing. It is understood that some front-facing camera may have a relatively wide field of view, even up to 180-degrees. Similarly, a rear-facing camera that is directed at an angle (perhaps 60-degrees off center) to be used to detect traffic in adjacent traffic lanes, may also have a relatively wide field of view, which may overlap the field of view of the front-facing camera. Side-facing sensors are those that are directed outward from the sides of the vehicle 104. Cameras in the sensor array may include infrared or visible light cameras, able to focus at long-range or short-range with narrow or large fields of view.

The vehicle 104 may also include various other sensors, such as driver identification sensors (e.g., a seat sensor, an eye tracking and identification sensor, a fingerprint scanner, a voice recognition module, or the like), occupant sensors, or various environmental sensors to detect wind velocity, outdoor temperature, barometer pressure, rain/moisture, or the like.

Components of the object detection system 102 may communicate using a network, which may include local-area networks (LAN), wide-area networks (WAN), wireless networks (e.g., 802.11 or cellular network), the Public Switched Telephone Network (PSTN) network, ad hoc networks, personal area networks (e.g., Bluetooth), vehicle-based networks (e.g., Controller Area Network (CAN) BUS), or other combinations or permutations of network protocols and network types. The network may include a single local area network (LAN) or wide-area network (WAN), or combinations of LANs or WANs, such as the Internet. The various devices coupled to the network may be coupled to the network via one or more wired or wireless connections.

In operation, the vehicle 104 obtains sensor data via the sensor array interface 106 from sensors integrated in the vehicle 104, or sensors that are communicatively coupled to the vehicle 104. The sensors include at least a LiDAR system, but may also include radar, visible light cameras, acoustic sensors, environmental sensors, infrared sensors, or combinations thereof. LiDAR provides a three-dimensional (3D) point cloud of light reflections of objects around the vehicle 104.

The FS circuit 108 provides data filtration and segmentation of the LiDAR point cloud. Filters are based on (x,y,z) coordinates of the points in the 3D LiDAR point cloud. This method of filtering is highly compute efficient and robust compared to existing methods, which use largest plane detection, difference in normal, Min-Cut algorithms based on graph theory, etc. These less-efficient existing methods also tend to use a number of user input parameters, making them vulnerable to overfitting to certain types of scenarios. In contrast, the method implemented by the FS circuit 108 is more generally applicable and uses fewer user input parameters.

The FS circuit 108 filters out ground returns based on z-value of the returns (e.g., $z<-1$), removes returns from the road (e.g., $10>y>-8$), and those returns from behind the vehicle 104 (e.g., $x<4$). The coordinate planes are arranged such that the vehicle 104 is at coordinate (0,0,0) and arranged on the x-axis longitudinally. The y-axis is from left (positive y values) to right (negative y values), and the z-axis is from below the horizon (negative z values) to above the horizon (positive z values). The horizon may be set at the vertical centerline of a field of view of the LiDAR sensor. It is understood that the horizon may be adjusted based on different implementations. Moving the horizon may require changing threshold cutoff values for the filtering operation.

Figure 2:
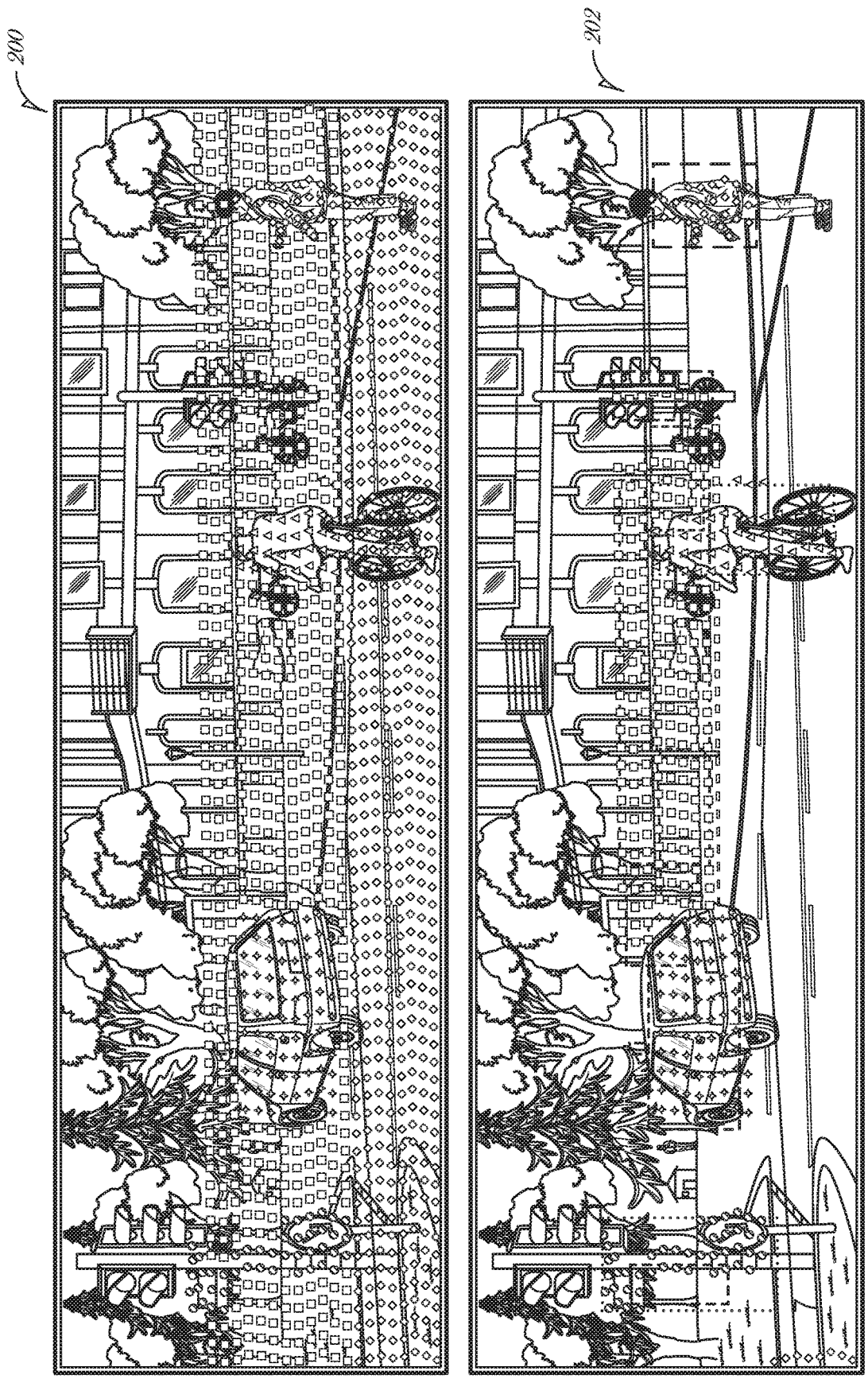
FIG. 2 illustrates a filtering data pre-processing operation, according to an embodiment.

By performing the coordinate-based filtering, the FS circuitry 108 is able to reduce nearly 90% of the input data (e.g., point cloud data), according to various experimental results. FIG. 2 illustrates a filtering data pre-processing operation, according to an embodiment. Scene 200 illustrates all LiDAR return data in the direction of travel superimposed on an image frame. Scene 202 illustrates filtered LiDAR data superimposed on the image frame. The filtered LiDAR data removes ground return and data from off the sides of the road.

Figure 3:
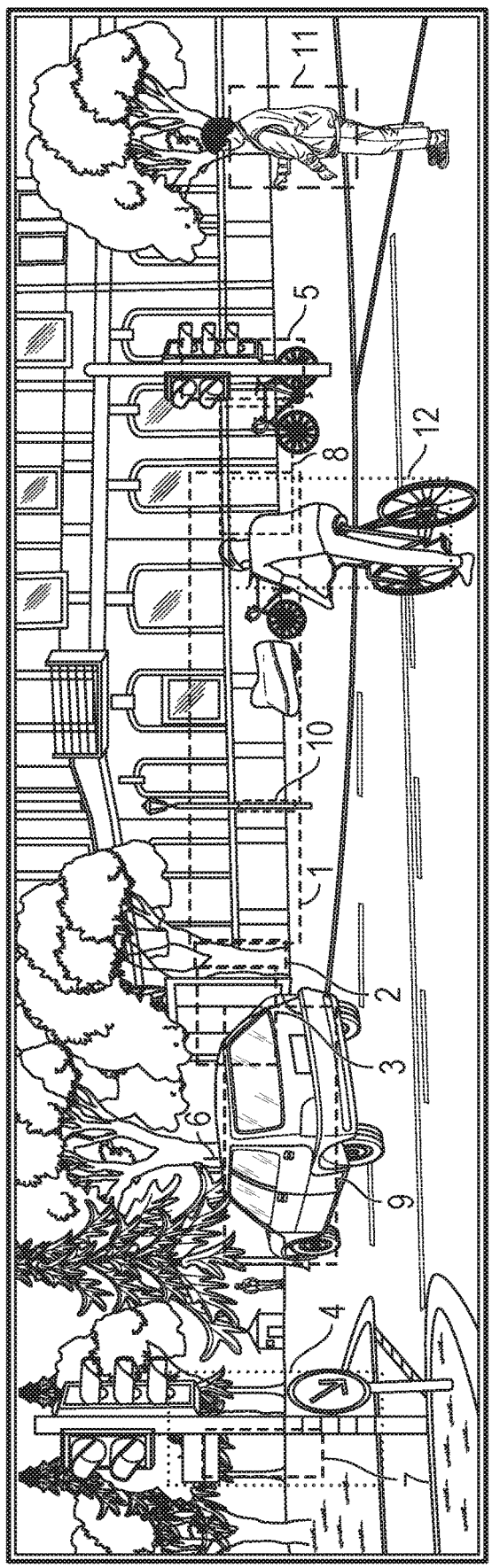
FIG. 3 illustrates an example scene of segmented image data, according to an embodiment.
Figure 4A:
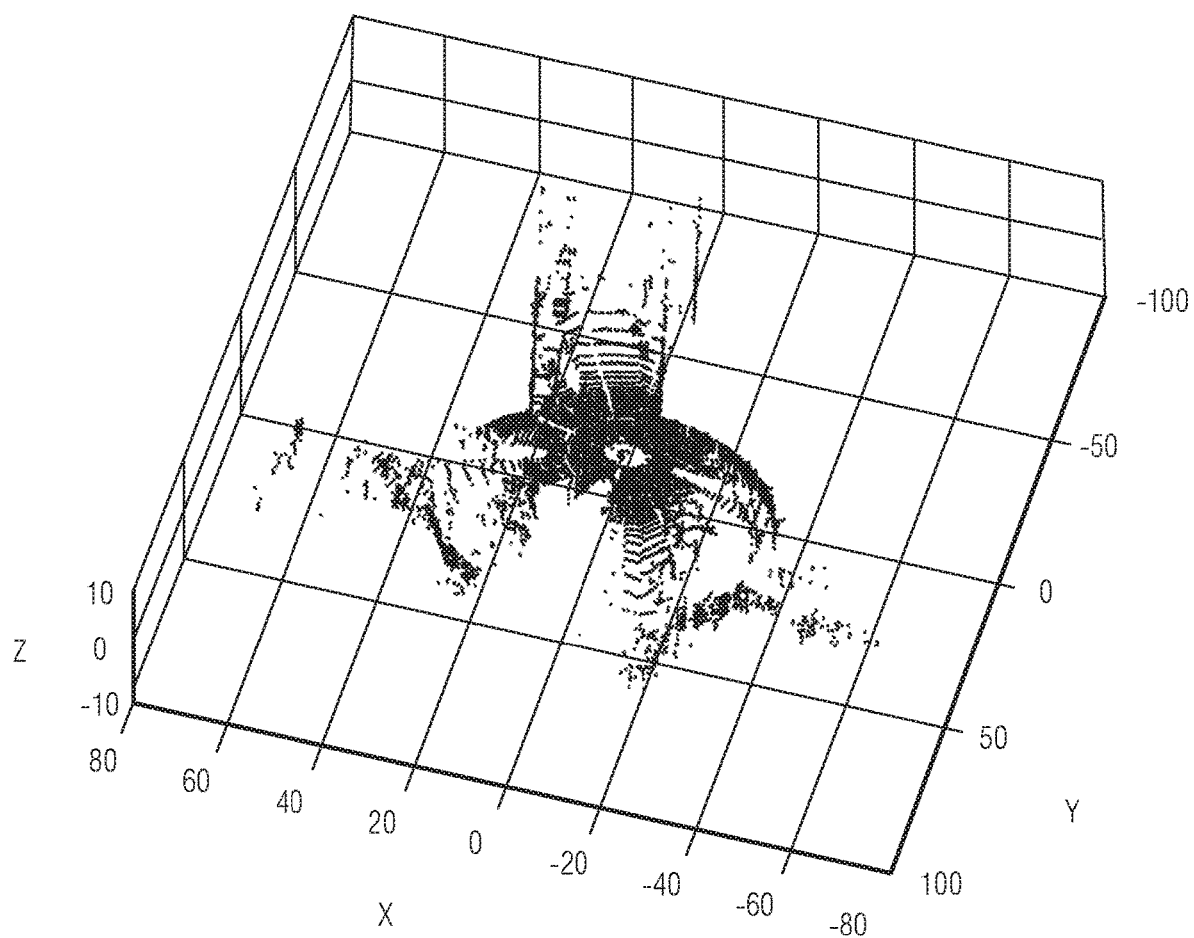
FIGS. 4A-4D illustrate a filtering data pre-processing operation, according to an embodiment.
Figure 4B:
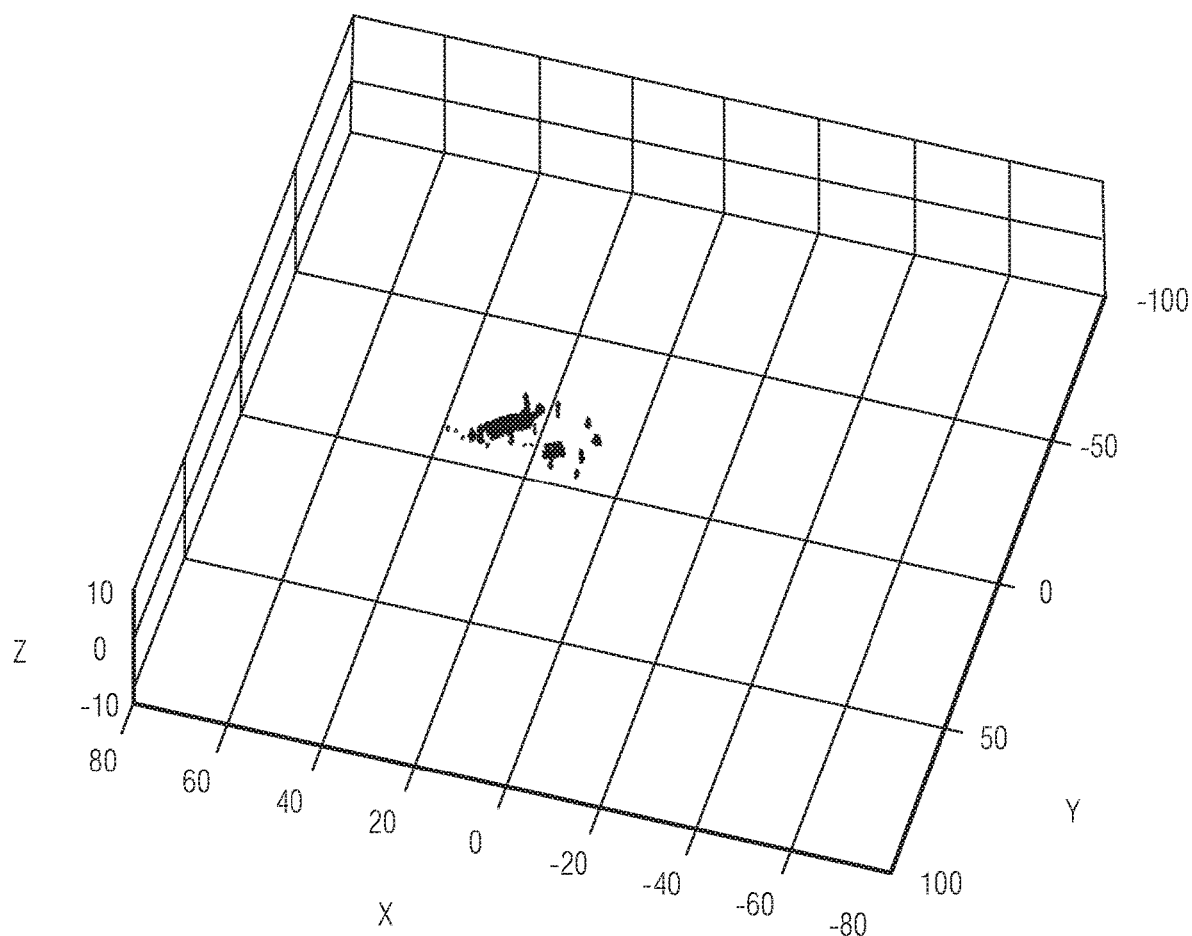
Figure 4C:
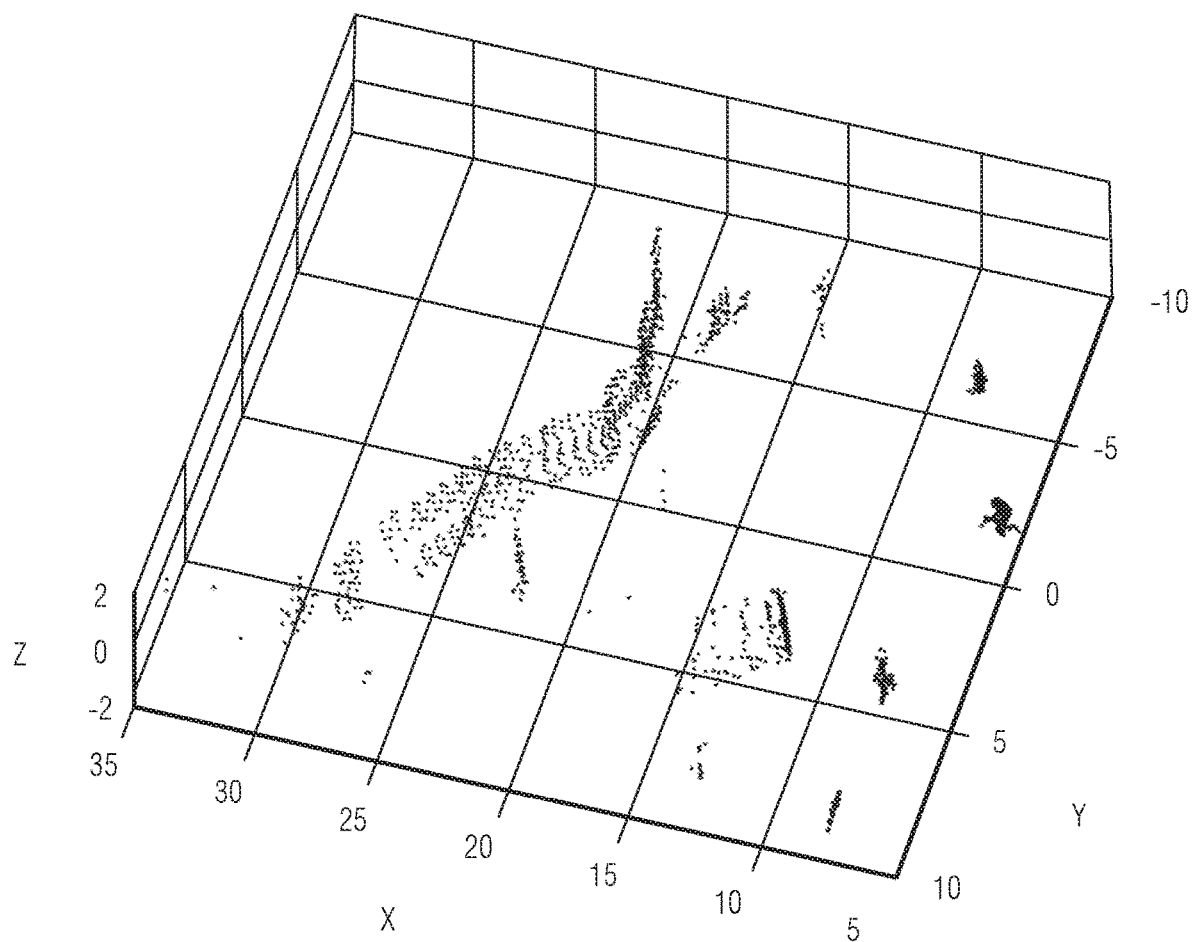
Figure 4D:
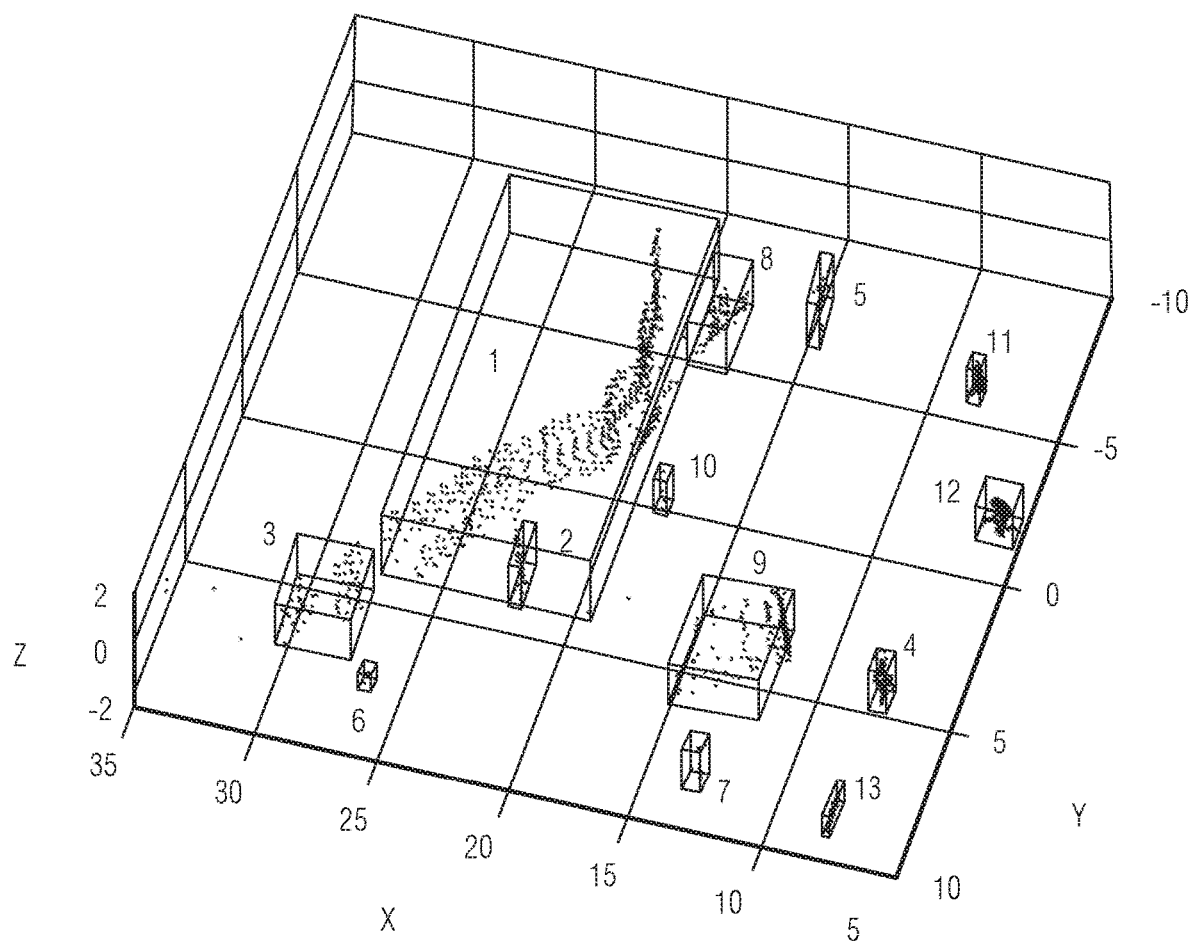

Returning to FIG. 1, the FS circuit 108 then performs segmentation on the filtered data using an adaptive segmentation algorithm. The adaptive segmentation algorithm identifies clusters of point cloud data using parameters computed, which are adaptive to distance from the vehicle 104. The 3D coordinates are obtained by segmenting point cloud data in LiDAR space. The 2D coordinates are obtained by using a transformation matrix, precomputed to generate corresponding 2D coordinates for each point in 3D space. The 2D boxes are then superimposed on to the image frame. The image frames are not used for generating the corresponding 2D boxes. FIG. 3 illustrates an example scene of segmented image data. The segments are labeled with bounding boxes and numerals. FIGS. 4A-4D illustrate a filtering data pre-processing operation, according to an embodiment. FIG. 4A illustrates a 3D point cloud before filtering. FIG. 4B illustrates the filtered data, reducing the data to 5.07% of the original 3D point cloud, in this example. FIG. 4C illustrates the same filtered data set, but with the plat rescaled. FIG. 4D illustrates numbered segments in 3D data.

Returning to FIG. 1, the FS circuit 108 may further filter segments based on their z value (e.g., location above or below the horizon), height (e.g., the difference of max-z minus min-z), the volume of the segment, or combinations thereof. The z value of an object is observed with a minimum z (e.g., the lowest z value of the object) and a maximum z (e.g., the highest z value of the object). The difference between the min-z and max-z is the height.

In various embodiments, the FS circuit 108 may remove very high and insignificant segments with a minimum z threshold and a minimum volume threshold, for example, to filter out detected objects that are high in the horizon and also have low volume. The minimum z threshold evaluates the object's min-z value, and if it is sufficiently high above the horizon (e.g., above some relatively large positive z-value), then the object is considered "very high" and may be filtered, especially when it also has a low volume.

The FS circuit 108 may remove segments that are just thin slices using a minimum height threshold. If the height, as measured by looking at the min-z and max-z values, is less than a relatively small z-value, then the object may be filtered.

Additionally, the FS circuit 108 may remove low lying and insignificant segments using a maximum z threshold and a minimum volume threshold. If the max-z value (e.g., the top corner of an object) is under the horizon (e.g., at some negative z-value), then the object is considered low lying. If it is also low volume, then it may be filtered.

Figure 5:
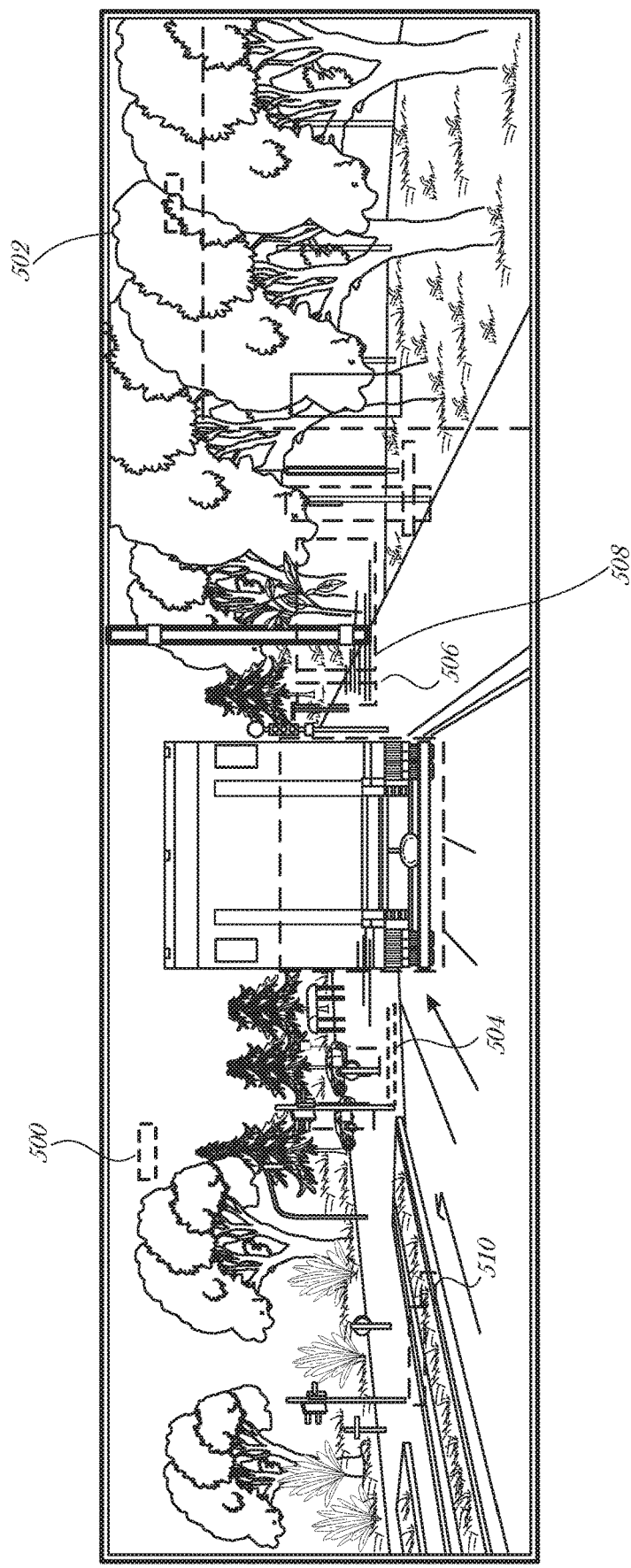
FIG. 5 illustrates an example scene, according to an embodiment.

FIG. 5 illustrates an example scene, according to an embodiment. In FIG. 5, several segments are identified as being high and insignificant when compared to threshold values (e.g., segments 500 and 502), several segments are identified as being sufficiently thin when compared to a threshold value (e.g., segments 504, 506, and 508), and some segments are identified as being low lying and insignificant when compared to threshold values (e.g., segment 510).

Returning to FIG. 1, the FEOI circuit 110 extracts a number of features from the segmented data that was produced by the FS circuit 108. The features are categorized as radiometric, spatial, and structural features.

In experiments with a large number of images and LiDAR data, it was observed that very simple features extracted from point cloud LiDAR data are highly discriminative across different objects. Aspect ratios between x, y, and z of 3D segments of LiDAR data, volumes of the LiDAR data segments, and location of the segments in the LiDAR frame were very indicative of the object type. Using the radiometric, spatial, and structural features, the FEOI circuit 110 is able to identify average feature values and produce labeled segments from the LiDAR data and other input data. This is described in more detail in the discussion of FIG. 6 below.

Several advantages result from the LiDAR-based implementation discussed here. The LiDAR-based implementation reduces the information investigation to radiometric parameters, spatial parameters, and structural parameters. As such, this implementation does not require analyzing motion parameters of objects in a scene. Analyzing motion requires analysis of multiple image frames. Using multiple image frames for motion parameter analysis requires additional time. For instance, if the sampling time (e.g., rotations of LiDAR sensor) is 10 Hz, then it may take up to one second to obtain enough motion data to perform classification in some disadvantageous implementations. In contrast, the LiDAR-based implementation discussed here only requires one image frame.

When motion data is used, then multiple frames are required, additionally, occlusion is an issue. For instance, when the object being tracked is occluded for one or more frames, the additional frames may be needed to obtain the motion data necessary to perform object classification. In contrast, the LiDAR-based implementation discussed here only requires one frame. So if the object is occluded in a frame, then in the next captured frame, the object may be detected. Overhead due to occlusion is minimized.

Additionally, motion-based object tracking and classification methods may not be able to track stationary objects. In contrast, the systems and methods described here are able to track stationary objects, such as trees, poles, walls, signs, etc.

Another advantage of the disclosed system is that it is able to classify objects with as little as two or three points in a segment. This is due to the types of features used in the machine learning algorithm. These segments are classified as others or noise, unless the radiometric values (intensity) are significant.

The FS circuit 108 and FEOI circuit 110 may be implemented using special-purpose hardware, application specific integrated circuits (ASIC), field programmable gate arrays (FPGA), Hadoop clusters, or the like. FS circuit 108 or FEOI circuit 110 may be implemented in software and executed on the processor 112.

Further, while some embodiments are discussed in the context of a vehicle, it is understood that other machines may implement LiDAR-based object detection, such as drones, robots, security systems, and the like. As such, the systems and methods disclosed herein are not limited to vehicle applications.

Figure 6:
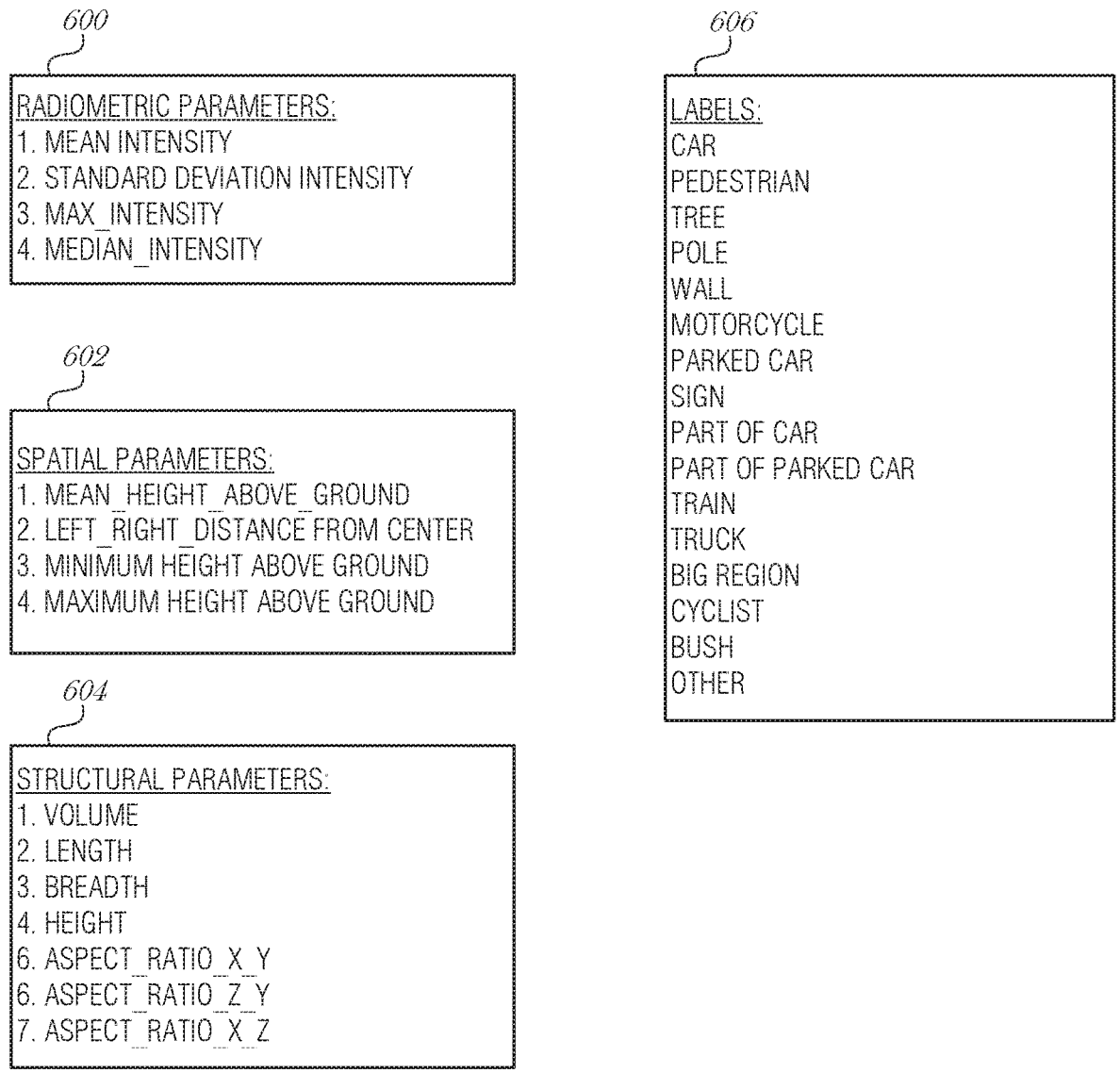
FIG. 6 is an illustration of features and labels used in a supervised learning model, according to an embodiment.

FIG. 6 is an illustration of features and labels used in a supervised learning model according to an embodiment. The supervised learning model is a support vector machine (SVM) machine learning model that uses radiometric parameters 600, spatial parameters 602, and structural parameters 604. The SVM may be trained to label segments with labels 606. The labels 606 illustrated in FIG. 6 are non-limiting.

Radiometric parameters 600 refer to the LiDAR returns and the intensity of the return signal. Mean intensity values, standard deviation intensity values, maximum intensity values, and median intensity values are computed for each segment of interest. Additional or different intensity features may be used without departing from the scope of this document. Intensity may be discriminative across certain types of objects (e.g., metal objects versus trees).

Spatial parameters 602 refer to the object's location in 3D space. Some spatial parameters that may be computed include mean height above the ground plane, left or right distance from the center line, minimum height above the ground plane, or maximum height above the ground plane. Additional or different spatial features may be used without departing from the scope of this document. The location of the segment of interest is discriminative and may be used to filter out noise or unclassified objects. Examples of spatial-based discrimination include poles and road signs, which generally have a greater mean Bucketed Mean Y value as they are often along the sides of the road. Further, a relatively large minimum z value (the lower bound of the z-axis measurement of the object) may indicate that the object is uninteresting. For instance, an object where its lowest z-value is high above the horizon may indicate a "floating object", such as a traffic light where the bottom part of the traffic light occluded.

Structural parameters 604 refer to geometric aspects of the object. Structural parameters 604 include volume, length (x-axis), width (y-axis), height (z-axis), x-y aspect ratio, z-y aspect ratio, and x-z aspect ratio. Additional or different structural features may be used without departing from the scope of this document. Structural parameters are very discriminative and may be used to filter out unclassified objects. Examples of structural-based discrimination include poles, which have a significantly higher z-y ratio (e.g., tall and narrow) than other objects; walls, which have a significantly higher volume than most other objects.

Figure 7:
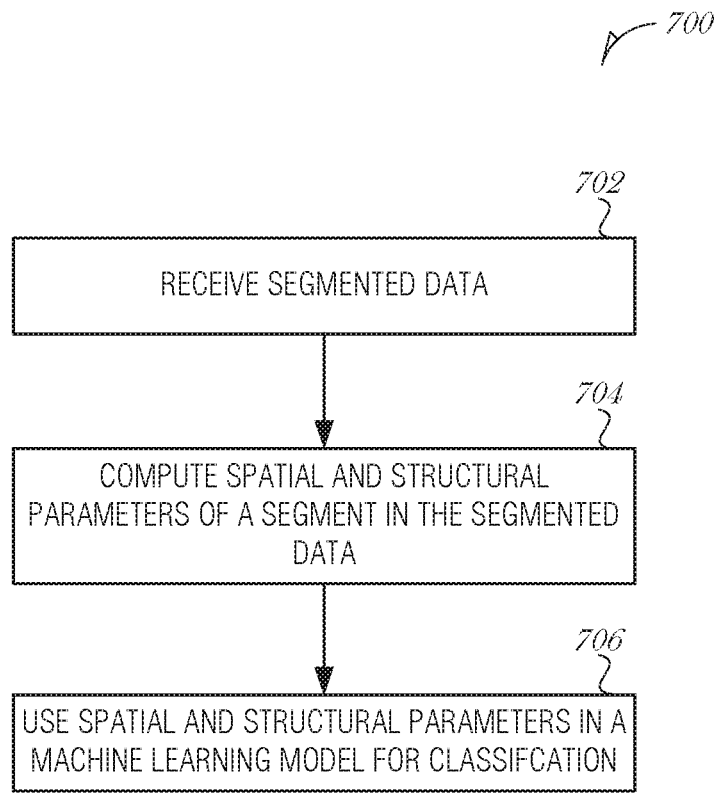
FIG. 7 is a flowchart illustrating a method for detecting objects, according to an embodiment.

FIG. 7 is a flowchart illustrating a method 700 for detecting objects, according to an embodiment. At 702, segmented data of an environment around an object detection system is received at a feature extraction and object identification (FEOI) circuit, the segmented data obtained using a light imaging detection and ranging (LiDAR) system, oriented with respect to a direction of travel. In an embodiment, the segmented data has only a single frame of LiDAR data.

In an embodiment, the method 700 includes filtering input LiDAR data to remove ground returns to produce filtered LiDAR data and using the filtered LiDAR data to generate the segmented data. In a related embodiment, the method 700 includes filtering input LiDAR data to remove returns from off the side of the direction of travel to produce filtered LiDAR data and using the filtered LiDAR data to generate the segmented data. In a related embodiment, the method 700 includes filtering input LiDAR data to remove returns from an opposite direction of the direction of travel to produce filtered LiDAR data and using the filtered LiDAR data to generate the segmented data. In a further embodiment, the method includes identifying clusters in the filtered LiDAR data using an adaptive distance-based technique.

At 704, spatial and structural parameters of a segment of the segmented data are computed. In an embodiment, the segment is of a stationary object in the environment. In an embodiment, the spatial parameters include a location of the segment in a coordinate system oriented with respect to the object detection system. In a related embodiment, the structural parameters include an aspect ratio of a first dimension and a second dimension of the segment. In various embodiments, the first dimension is an x-axis and the second dimension is a y-axis in a coordinate system oriented with respect to the object detection system; the first dimension is a z-axis and the second dimension is a y-axis in a coordinate system oriented with respect to the object detection system; or the first dimension is an x-axis and the second dimension is a z-axis in a coordinate system oriented with respect to the object detection system.

In an embodiment, the structural parameters include a volume of the segment. In a related embodiment, the structural parameters include a length, breadth, or height of the segment.

At 706, the spatial and structural parameters are used with a machine learning model to obtain a classification of the segment.

In an embodiment, the method 700 includes computing radiometric parameters of the segment of the segmented data and using the radiometric parameters with the machine learning model to obtain the classification of the segment. In a related embodiment, the radiometric parameters include a mean intensity value of the segment. In a related embodiment, the radiometric parameters include a standard deviation intensity value of the segment. In a related embodiment, the radiometric parameters include a maximum intensity value of the segment. In a related embodiment, the radiometric parameters include a minimum intensity value of the segment.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

"Circuitry," as used in any embodiment herein, may comprise, for example, singly or in any combination, hard-wired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture.

Figure 8:
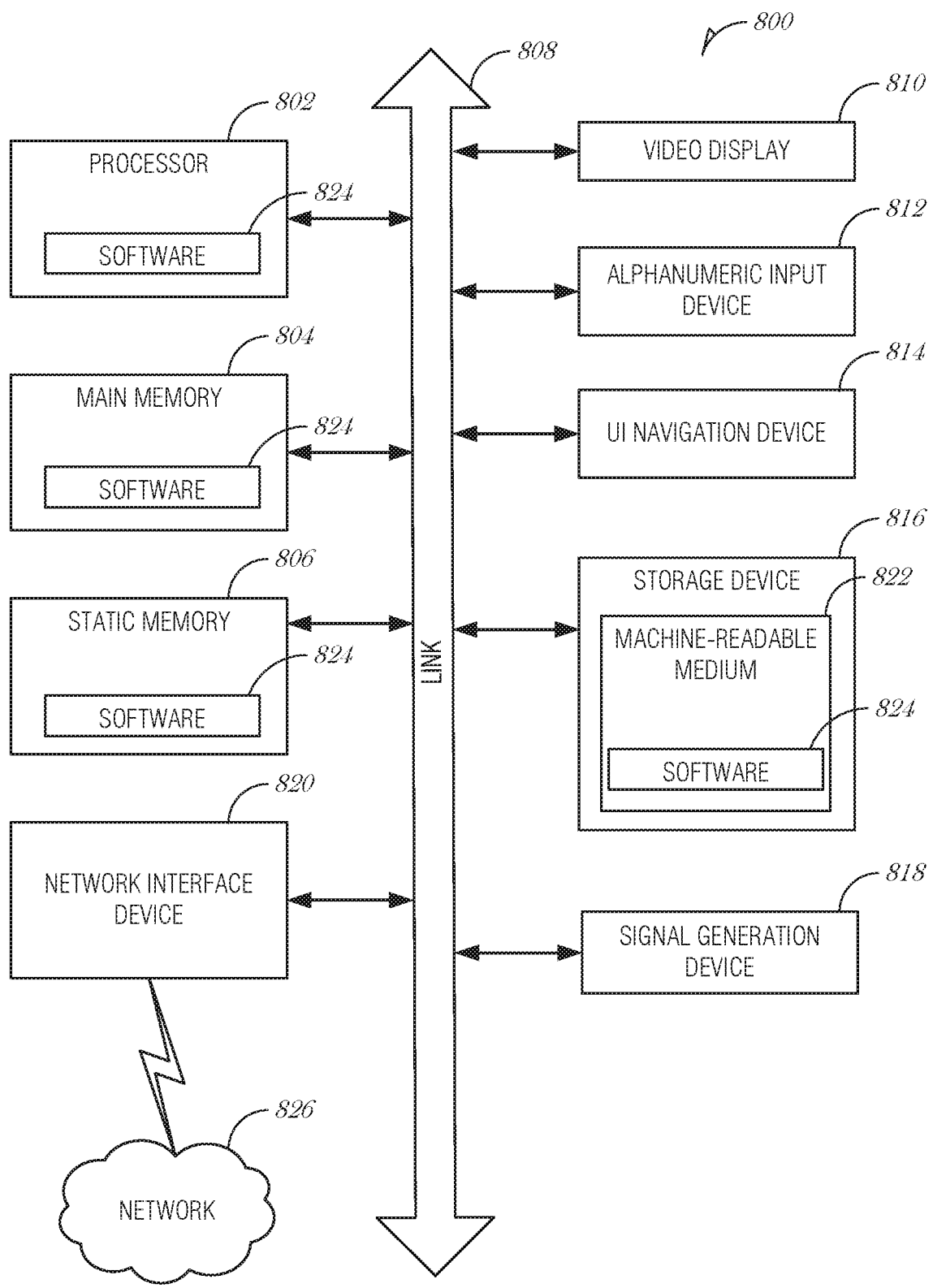
FIG. 8 is a block diagram illustrating an example machine upon which any one or more of the techniques (e.g., methodologies) discussed herein may perform, according to an embodiment.

FIG. 8 is a block diagram illustrating a machine in the example form of a computer system 800, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, a wearable device, a vehicle subsystem, a personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are incorporated into a touch screen display. The computer system 800 may additionally include a storage device 816 (e.g., a drive unit), a signal generation device 818 (e.g., a speaker), a network interface device 820, and one or more sensors (not shown), such as a global positioning system (GPS) sensor, compass, accelerometer, gyrometer, magnetometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include nonvolatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 is an object detection system, the system comprising: a feature extraction and object identification (FEOI) circuit to: receive segmented data of an environment around the object detection system, the segmented data obtained using a light imaging detection and ranging (Li-DAR) system, oriented with respect to a direction of travel; compute spatial and structural parameters of a segment of the segmented data; and use the spatial and structural parameters with a machine learning model to obtain a classification of the segment.

In Example 2, the subject matter of Example 1 includes, wherein the segmented data is received from a filter and segmentation circuit.

In Example 3, the subject matter of Example 2 includes, the filter and segmentation circuit.

In Example 4, the subject matter of Examples 2-3 includes, wherein the filter and segmentation circuit filters input data to remove ground returns.

In Example 5, the subject matter of Examples 2-4 includes, wherein the filter and segmentation circuit filters input data to remove returns from off the side of the direction of travel.

In Example 6, the subject matter of Examples 2-5 includes, wherein the filter and segmentation circuit filters input data to remove returns from an opposite direction of the direction of travel.

In Example 7, the subject matter of Examples 2-6 includes, wherein the filter and segmentation circuit identifies clusters in filtered LiDAR data using an adaptive distance-based technique.

In Example 8, the subject matter of Examples 1-7 includes, wherein the spatial parameters include a location of the segment in a coordinate system oriented with respect to the object detection system.

In Example 9, the subject matter of Examples 1-8 includes, wherein the structural parameters include an aspect ratio of a first dimension and a second dimension of the segment.

In Example 10, the subject matter of Example 9 includes, wherein the first dimension is an x-axis and the second dimension is a y-axis in a coordinate system oriented with respect to the object detection system.

In Example 11, the subject matter of Examples 9-10 includes, wherein the first dimension is a z-axis and the second dimension is a y-axis in a coordinate system oriented with respect to the object detection system.

In Example 12, the subject matter of Examples 9-11 includes, wherein the first dimension is an x-axis and the second dimension is a z-axis in a coordinate system oriented with respect to the object detection system.

In Example 13, the subject matter of Examples 1-12 includes, wherein the structural parameters include a volume of the segment.

In Example 14, the subject matter of Examples 1-13 includes, wherein the structural parameters include a length, breadth, or height of the segment.

In Example 15, the subject matter of Examples 1-14 includes, wherein the FEOI circuit is to: compute radiometric parameters of the segment of the segmented data; and use the radiometric parameters with the machine learning model to obtain the classification of the segment.

In Example 16, the subject matter of Example 15 includes, wherein the radiometric parameters include a mean intensity value of the segment.

In Example 17, the subject matter of Examples 15-16 includes, wherein the radiometric parameters include a standard deviation intensity value of the segment.

In Example 18, the subject matter of Examples 15-17 includes, wherein the radiometric parameters include a maximum intensity value of the segment.

In Example 19, the subject matter of Examples 15-18 includes, wherein the radiometric parameters include a minimum intensity value of the segment.

In Example 20, the subject matter of Examples 1-19 includes, wherein the segment is of a stationary object in the environment.

In Example 21, the subject matter of Examples 1-20 includes, wherein the segmented data has only a single frame of LiDAR data.

Example 22 is a method of detecting objects, the method comprising: receiving at a feature extraction and object identification (FEOI) circuit, segmented data of an environment around an object detection system that includes the FEOI circuit, the segmented data obtained using a light imaging detection and ranging (LiDAR) system, oriented with respect to a direction of travel; computing spatial and structural parameters of a segment of the segmented data; and using the spatial and structural parameters with a machine learning model to obtain a classification of the segment.

In Example 23, the subject matter of Example 22 includes, filtering input LiDAR data to remove ground returns to produce filtered LiDAR data; and using the filtered LiDAR data to generate the segmented data.

In Example 24, the subject matter of Examples 22-23 includes, filtering input LiDAR data to remove returns from off the side of the direction of travel to produce filtered LiDAR data; and using the filtered LiDAR data to generate the segmented data.

In Example 25, the subject matter of Examples 22-24 includes, filtering input LiDAR data to remove returns from an opposite direction of the direction of travel to produce filtered LiDAR data; and using the filtered LiDAR data to generate the segmented data.

In Example 26, the subject matter of Examples 23-25 includes, identifying clusters in the filtered LiDAR data using an adaptive distance-based technique.

In Example 27, the subject matter of Examples 22-26 includes, wherein the spatial parameters include a location of the segment in a coordinate system oriented with respect to the object detection system.

In Example 28, the subject matter of Examples 22-27 includes, wherein the structural parameters include an aspect ratio of a first dimension and a second dimension of the segment.

In Example 29, the subject matter of Example 28 includes, wherein the first dimension is an x-axis and the second dimension is a y-axis in a coordinate system oriented with respect to the object detection system.

In Example 30, the subject matter of Examples 28-29 includes, wherein the first dimension is a z-axis and the second dimension is a y-axis in a coordinate system oriented with respect to the object detection system.

In Example 31, the subject matter of Examples 28-30 includes, wherein the first dimension is an x-axis and the second dimension is a z-axis in a coordinate system oriented with respect to the object detection system.

In Example 32, the subject matter of Examples 22-31 includes, wherein the structural parameters include a volume of the segment.

In Example 33, the subject matter of Examples 22-32 includes, wherein the structural parameters include a length, breadth, or height of the segment.

In Example 34, the subject matter of Examples 22-33 includes, computing radiometric parameters of the segment of the segmented data; and using the radiometric parameters with the machine learning model to obtain the classification of the segment.

In Example 35, the subject matter of Example 34 includes, wherein the radiometric parameters include a mean intensity value of the segment.

In Example 36, the subject matter of Examples 34-35 includes, wherein the radiometric parameters include a standard deviation intensity value of the segment.

In Example 37, the subject matter of Examples 34-36 includes, wherein the radiometric parameters include a maximum intensity value of the segment.

In Example 38, the subject matter of Examples 34-37 includes, wherein the radiometric parameters include a minimum intensity value of the segment.

In Example 39, the subject matter of Examples 22-38 includes, wherein the segment is of a stationary object in the environment.

In Example 40, the subject matter of Examples 22-39 includes, wherein the segmented data has only a single frame of LiDAR data.

Example 41 is at least one machine-readable medium including instructions, which when executed by a machine, cause the machine to perform operations of any of the methods of Examples 22-40.

Example 42 is an apparatus comprising means for performing any of the methods of Examples 22-40.

Example 43 is an apparatus for detecting objects, the apparatus comprising: means for receiving at a feature extraction and object identification (FEOI) circuit, segmented data of an environment around an object detection system that includes the FEOI circuit, the segmented data obtained using a light imaging detection and ranging (LiDAR) system, oriented with respect to a direction of travel; means for computing spatial and structural parameters of a segment of the segmented data; and means for using the spatial and structural parameters with a machine learning model to obtain a classification of the segment.

In Example 44, the subject matter of Example 43 includes, wherein the segmented data is received from a filter and segmentation circuit.

In Example 45, the subject matter of Example 44 includes, wherein the filter and segmentation circuit filters input data to remove ground returns.

In Example 46, the subject matter of Examples 44-45 includes, wherein the filter and segmentation circuit filters input data to remove returns from off the side of the direction of travel.

In Example 47, the subject matter of Examples 44-46 includes, wherein the filter and segmentation circuit filters input data to remove returns from an opposite direction of the direction of travel.

In Example 48, the subject matter of Examples 44-47 includes, wherein the filter and segmentation circuit identifies clusters in filtered LiDAR data using an adaptive distance-based technique.

In Example 49, the subject matter of Examples 43-48 includes, wherein the spatial parameters include a location of the segment in a coordinate system oriented with respect to the object detection system.

In Example 50, the subject matter of Examples 43-49 includes, wherein the structural parameters include an aspect ratio of a first dimension and a second dimension of the segment.

In Example 51, the subject matter of Example 50 includes, wherein the first dimension is an x-axis and the second dimension is a y-axis in a coordinate system oriented with respect to the object detection system.

In Example 52, the subject matter of Examples 50-51 includes, wherein the first dimension is a z-axis and the second dimension is a y-axis in a coordinate system oriented with respect to the object detection system.

In Example 53, the subject matter of Examples 50-52 includes, wherein the first dimension is an x-axis and the second dimension is a z-axis in a coordinate system oriented with respect to the object detection system.

In Example 54, the subject matter of Examples 43-53 includes, wherein the structural parameters include a volume of the segment.

In Example 55, the subject matter of Examples 43-54 includes, wherein the structural parameters include a length, breadth, or height of the segment.

In Example 56, the subject matter of Examples 43-55 includes, means for computing radiometric parameters of the segment of the segmented data; and means for using the radiometric parameters with the machine learning model to obtain the classification of the segment.

In Example 57, the subject matter of Example 56 includes, wherein the radiometric parameters include a mean intensity value of the segment.

In Example 58, the subject matter of Examples 56-57 includes, wherein the radiometric parameters include a standard deviation intensity value of the segment.

In Example 59, the subject matter of Examples 56-58 includes, wherein the radiometric parameters include a maximum intensity value of the segment.

In Example 60, the subject matter of Examples 56-59 includes, wherein the radiometric parameters include a minimum intensity value of the segment.

In Example 61, the subject matter of Examples 43-60 includes, wherein the segment is of a stationary object in the environment.

In Example 62, the subject matter of Examples 43-61 includes, wherein the segmented data has only a single frame of LiDAR data.

Example 63 is at least one machine-readable medium of detecting objects including instructions, the instructions when executed by an object detection system installed in a vehicle, cause the object detection system to perform the operations comprising: receiving at a feature extraction and object identification (FEOI) circuit, segmented data of an environment around the object detection system, the segmented data obtained using a light imaging detection and ranging (LiDAR) system, oriented with respect to a direction of travel; computing spatial and structural parameters of a segment of the segmented data; and using the spatial and structural parameters with a machine learning model to obtain a classification of the segment.

In Example 64, the subject matter of Example 63 includes, wherein the segmented data is received from a filter and segmentation circuit.

In Example 65, the subject matter of Example 64 includes, wherein the filter and segmentation circuit filters input data to remove ground returns.

In Example 66, the subject matter of Examples 64-65 includes, wherein the filter and segmentation circuit filters input data to remove returns from off the side of the direction of travel.

In Example 67, the subject matter of Examples 64-66 includes, wherein the filter and segmentation circuit filters input data to remove returns from an opposite direction of the direction of travel.

In Example 68, the subject matter of Examples 64-67 includes, wherein the filter and segmentation circuit identifies clusters in filtered LiDAR data using an adaptive distance-based technique.

In Example 69, the subject matter of Examples 63-68 includes, wherein the spatial parameters include a location of the segment in a coordinate system oriented with respect to the object detection system.

In Example 70, the subject matter of Examples 63-69 includes, wherein the structural parameters include an aspect ratio of a first dimension and a second dimension of the segment.

In Example 71, the subject matter of Example 70 includes, wherein the first dimension is an x-axis and the second dimension is a y-axis in a coordinate system oriented with respect to the object detection system.

In Example 72, the subject matter of Examples 70-71 includes, wherein the first dimension is a z-axis and the second dimension is a y-axis in a coordinate system oriented with respect to the object detection system.

In Example 73, the subject matter of Examples 70-72 includes, wherein the first dimension is an x-axis and the second dimension is a z-axis in a coordinate system oriented with respect to the object detection system.

In Example 74, the subject matter of Examples 63-73 includes, wherein the structural parameters include a volume of the segment.

In Example 75, the subject matter of Examples 63-74 includes, wherein the structural parameters include a length, breadth, or height of the segment.

In Example 76, the subject matter of Examples 63-75 includes, computing radiometric parameters of the segment of the segmented data; and using the radiometric parameters with the machine learning model to obtain the classification of the segment.

In Example 77, the subject matter of Example 76 includes, wherein the radiometric parameters include a mean intensity value of the segment.

In Example 78, the subject matter of Examples 76-77 includes, wherein the radiometric parameters include a standard deviation intensity value of the segment.

In Example 79, the subject matter of Examples 76-78 includes, wherein the radiometric parameters include a maximum intensity value of the segment.

In Example 80, the subject matter of Examples 76-79 includes, wherein the radiometric parameters include a minimum intensity value of the segment.

In Example 81, the subject matter of Examples 63-80 includes, wherein the segment is of a stationary object in the environment.

In Example 82, the subject matter of Examples 63-81 includes, wherein the segmented data has only a single frame of LiDAR data.

Example 83 is at least one machine-readable medium including instructions that, when executed by processing circuitry, cause the processing circuitry to perform operations to implement of any of Examples 1-82.

Example 84 is an apparatus comprising means to implement of any of Examples 1-82.

Example 85 is a system to implement of any of Examples 1-82.

Example 86 is a method to implement of any of Examples 1-82.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An object detection system, the system comprising:
   a feature extraction and object identification (FEOI) circuit configured to:
      receive segmented data of an environment around the object detection system, the segmented data obtained from a single three dimensional light imaging detection and ranging (LiDAR) frame captured by a LiDAR system oriented with respect to a direction of travel, wherein the single three dimensional LiDAR frame is captured by a single scan of the environment using laser light;
      compute spatial parameters of a segment of the segmented data obtained from the single three dimensional LiDAR frame, wherein the spatial parameters are a location of an object in three dimensional space;
      compute radiometric parameters of the segment of the segmented data obtained from the single three dimensional LiDAR frame, wherein the radiometric parameters include an intensity of a return signal from the LiDAR;

compute structural parameters of the segment of the segmented data obtained from the single three dimensional LiDAR frame, wherein the structural parameters are geometric aspects of the object; and use the spatial parameters, the radiometric parameters, and the structural parameters as sole input to a machine learning model to obtain a classification of the segment, wherein the machine learning model only accepts input parameters that are computed from any single three dimensional LiDAR frame, and wherein the classification includes an identification of an object type.

2. The system of claim 1, wherein the segmented data is received from a filter and segmentation circuit.

3. The system of claim 2, further comprising the filter and segmentation circuit.

4. The system of claim 2, wherein the filter and segmentation circuit filters input data to remove ground returns.

5. The system of claim 2, wherein the filter and segmentation circuit filters input data to remove returns from off a side of the direction of travel.

6. The system of claim 2, wherein the filter and segmentation circuit filters input data to remove returns from an opposite direction of the direction of travel.

7. The system of claim 2, wherein the filter and segmentation circuit identifies clusters in filtered LiDAR data using an adaptive distance-based technique, wherein the adaptive distance-based technique modifies clustering parameters based on a distance from the object detection system.

8. The system of claim 1, wherein the spatial parameters include a location of the segment in a coordinate system oriented with respect to the object detection system.

9. The system of claim 1, wherein the structural parameters include an aspect ratio of a first dimension and a second dimension of the segment.

10. The system of claim 9, wherein the first dimension is an x-axis and the second dimension is a y-axis in a coordinate system oriented with respect to the object detection system.

11. The system of claim 9, wherein the first dimension is a z-axis and the second dimension is a y-axis in a coordinate system oriented with respect to the object detection system.

12. The system of claim 9, wherein the first dimension is an x-axis and the second dimension is a z-axis in a coordinate system oriented with respect to the object detection system.

13. The system of claim 1, wherein the structural parameters include a volume of the segment.

14. The system of claim 1, wherein the structural parameters include a length, breadth, or height of the segment.

15. The system of claim 1, wherein the intensity of the return signal from the LiDAR is a mean intensity value of the segment.

16. The system of claim 1, wherein the intensity of the return signal from the LiDAR is a standard deviation intensity value of the segment.

17. The system of claim 1, wherein the intensity of the return signal from the LiDAR is a maximum intensity value of the segment.

18. The system of claim 1, wherein the intensity of the return signal from the LiDAR is a minimum intensity value of the segment.

19. The system of claim 1, wherein the segment is of a stationary object in the environment.

20. A method of detecting objects, the method comprising:

receiving at a feature extraction and object identification (FEOI) circuit, segmented data of an environment around an object detection system that includes the FEOI circuit, the segmented data obtained from a single three dimensional light imaging detection and ranging (LiDAR) frame captured by a LiDAR system oriented with respect to a direction of travel, the segmented data being three dimensional, wherein the single three dimensional LiDAR frame is captured by a single scan of the environment using laser light;

computing spatial parameters of a segment of the segmented data obtained from a single three dimensional LiDAR frame, wherein the spatial parameters are a location of an object in three dimensional space;

computing radiometric parameters of the segment of the segmented data obtained from the single three dimensional LiDAR frame, wherein the radiometric parameters include an intensity of a return signal from the LiDAR;

computing structural parameters of the segment of the segmented data obtained from the single three dimensional LiDAR frame, wherein the structural parameters are geometric aspects of the object; and using the spatial parameters, the radiometric parameters, and the structural parameters as sole input to a machine learning model to obtain a classification of the segment, wherein the machine learning model only accepts input parameters that are computed from any single three dimensional LiDAR frame, and wherein the classification includes an identification of an object type.

21. At least one non-transitory machine-readable medium of detecting objects including instructions, the instructions when executed by an object detection system installed in a vehicle, cause the object detection system to perform operations comprising:

receiving at a feature extraction and object identification (FEOI) circuit, segmented data of an environment around the object detection system that includes the FEOI circuit, the segmented data obtained from a single three dimensional light imaging detection and ranging (LiDAR) frame captured by a LiDAR system oriented with respect to a direction of travel, wherein the single three dimensional LiDAR frame is captured by a single scan of the environment using laser light;

computing spatial parameters of a segment of the segmented data obtained from a single three dimensional LiDAR frame, wherein the spatial parameters are a location of an object in three dimensional space;

computing radiometric parameters of the segment of the segmented data obtained from the single three dimensional LiDAR frame, wherein the radiometric parameters include an intensity of a return signal from the LiDAR;

computing structural parameters of the segment of the segmented data obtained from the single three dimensional LiDAR frame, wherein the structural parameters are geometric aspects of the object; and using the spatial parameters, the radiometric parameters, and the structural parameters as sole input to a machine learning model to obtain a classification of the segment, wherein the machine learning model only accepts input parameters that are computed from any single three dimensional LiDAR frame, and wherein the classification includes an identification of an object type.

22. The at least one machine-readable medium of claim 21, wherein the structural parameters include an aspect ratio of a first dimension and a second dimension of the segment.

23. The at least one machine-readable medium of claim 21, wherein the spatial parameters include a location of the segment in a coordinate system oriented with respect to the object detection system.

24. The method of claim 20, wherein the structural parameters include an aspect ratio of a first dimension and a second dimension of the segment.

25. The method of claim 20, wherein the spatial parameters include a location of the segment in a coordinate system oriented with respect to the object detection system.

\* \* \* \* \*